United States Patent [19]

Carter

[11] Patent Number: 5,657,296
[45] Date of Patent: Aug. 12, 1997

[54] ACOUSTIC RECEIVER ASSEMBLY

[75] Inventor: G. Clifford Carter, Waterford, Conn.

[73] Assignee: The United States of America as represented by the Secretary of the Navy, Washington, D.C.

[21] Appl. No.: 656,116

[22] Filed: May 14, 1996

[51] Int. Cl.⁶ .................................................. H04R 17/00
[52] U.S. Cl. ................................... 367/153; 367/173
[58] Field of Search ............................ 367/153, 154, 367/165, 173

[56] References Cited

U.S. PATENT DOCUMENTS 4,328,569  5/1982  Trott et al. ........................... 367/153
4,661,938  4/1987  Jones et al. .......................... 367/153
5,091,892  2/1992  Secretan ............................. 367/153

*Primary Examiner*—Ian J. Lobo
*Attorney, Agent, or Firm*—Michael J. McGowan; James M. Kasischke; Prithvi C. Lall

[57] ABSTRACT

An acoustic receiver assembly includes a first tubular body and a multiplicity of first acoustic receivers disposed on an outer surface of the first body. A second tubular body is slidably movable in the first body and is extendible therefrom. A multiplicity of second acoustic receivers is disposed on an outer surface of the second body, the second acoustic receivers being receivable by the first body.

10 Claims, 5 Drawing Sheets

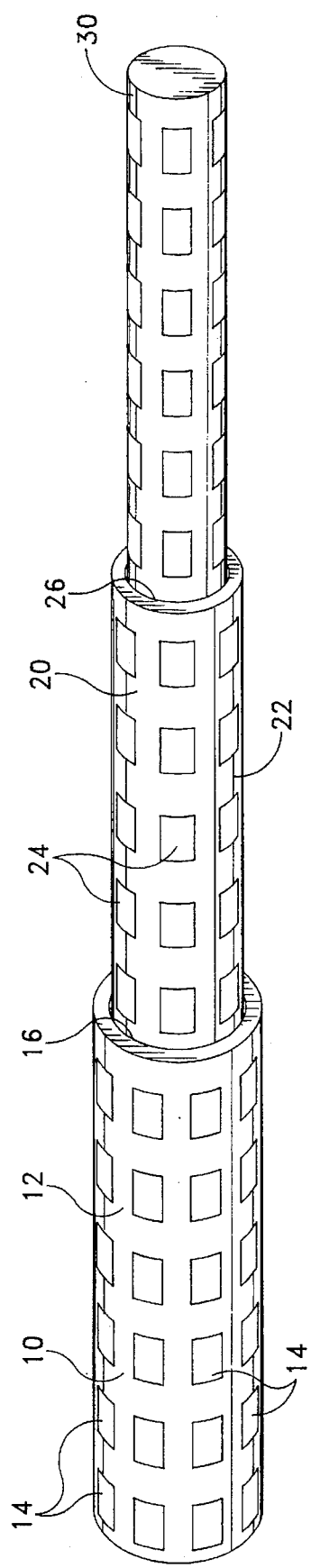
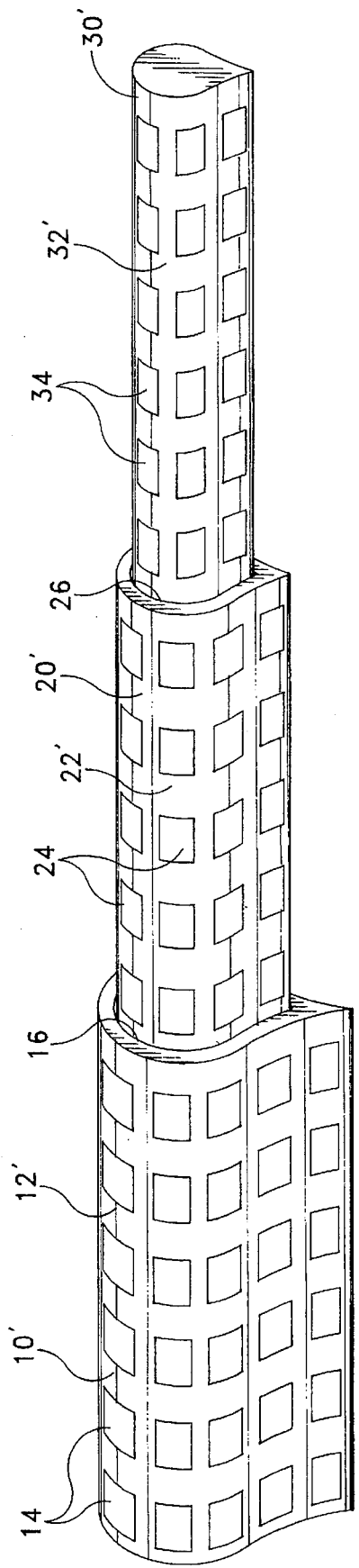
FIG. 1
FIG. 2

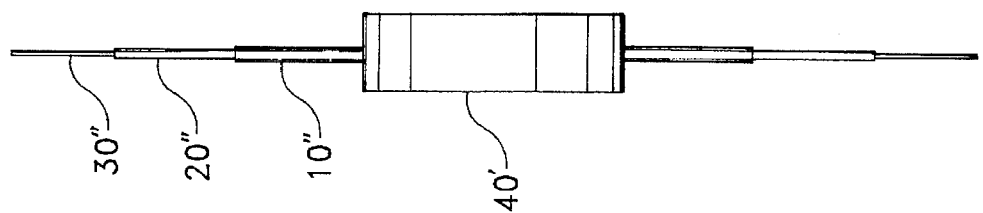
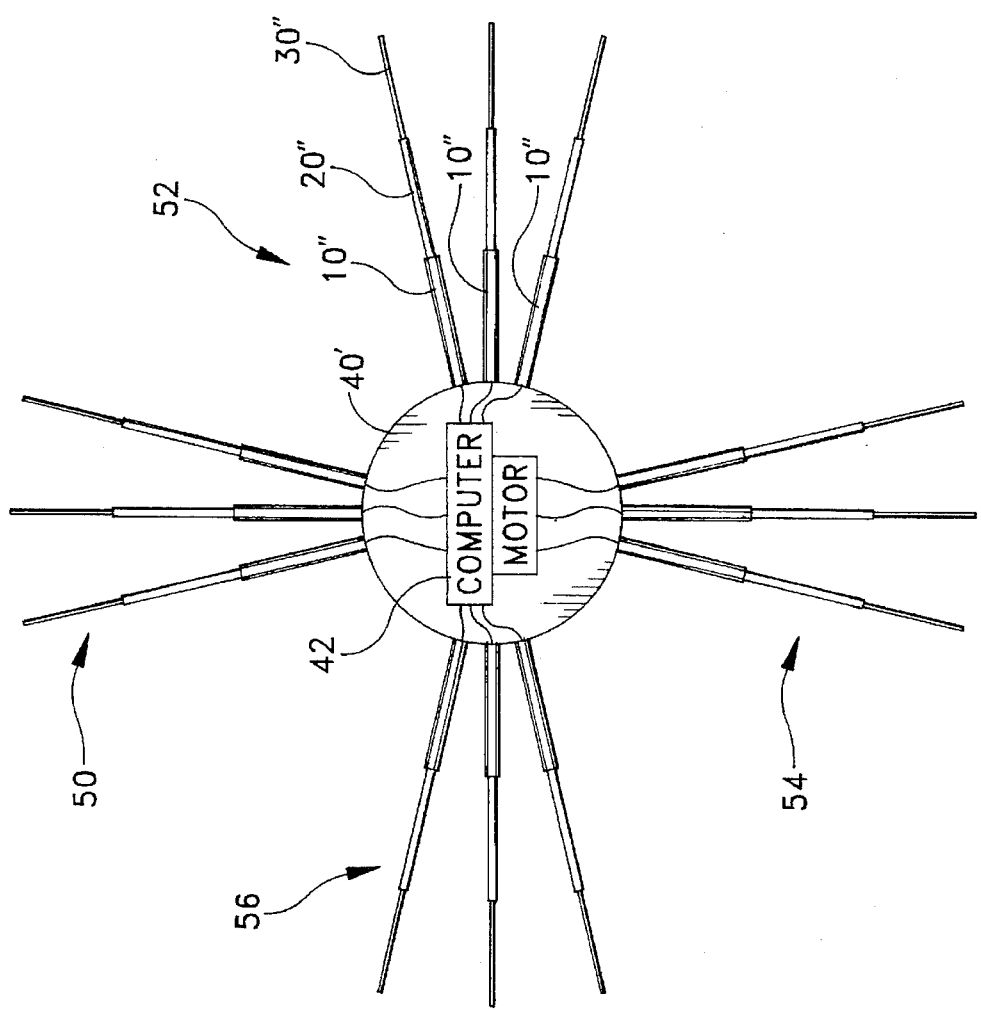
FIG. 5
FIG. 4

ACOUSTIC RECEIVER ASSEMBLY

STATEMENT OF GOVERNMENT INTEREST

The invention described herein may be manufactured by or for the Government of the United States of America for governmental purposes without the payment of royalties thereon or therefor.

BACKGROUND OF THE INVENTION (1) Field of the Invention

The invention relates to underwater sonar systems and is directed more particularly to an acoustic receiver assembly telescopically enlargeable to provide a large aperture acoustic array for receipt of underwater acoustic energy.

(2) Description of the Prior Art

Sonars are limited in performance by the size of the receiving array of hydrophones or other sensors in the array. Accordingly, the performance of a sonar unit is enhanced by increasing the physical size, or "aperture" of the receiving array. By the nature of the platform from which receiver assemblies are launched, such as aircraft, submarines and small surface craft, space is limited on board the platform and the launch window may be limited. For example, a torpedo tube is 21 inches in diameter and is therefore limited to launching a body of no more than 21 inches across. Accordingly, it is beneficial to have available for use acoustic receiver assemblies which require as little storage space as possible, can be ejected through a relatively small window, but can expand after launch to present a substantially larger reception aperture.

SUMMARY OF THE INVENTION

An object of the invention is, therefore, to provide an acoustic receiver assembly which can be expanded in size to provide a substantially larger reception aperture than is present in a non-expanded mode.

With the above and other objects in view, as will hereinafter appear, a feature of the present invention is the provision of an acoustic receiver assembly comprising a first tubular body, a multiplicity of first acoustic receivers disposed on an outer surface of the first body, a second tubular body slidably movable in the first tubular body and extendible therefrom, and a multiplicity of second acoustic receivers disposed on an outer surface of the second body, the second acoustic receivers being receivable by the first body.

In accordance with a further feature of the invention, there is provided an acoustic receiver assembly comprising a housing, a plurality of first tubular bodies extending outwardly from the housing, and a multiplicity of first acoustic receivers disposed on an outer surface of each of the first tubular bodies. The assembly further includes a second tubular body slidably movable in each of the first tubular bodies and extendible therefrom, and a multiplicity of second acoustic receivers disposed on an outer surface of each of the second bodies, the second acoustic receivers being receivable by the first bodies.

The above and other features of the invention, including various novel details of construction and combination of parts, will now be more particularly described with reference to the accompanying drawings and pointed out in the claims. It will be understood that the particular devices embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which are shown illustrative embodiments of the invention, from which its novel features and advantages will be apparent.

In the drawings:

FIG. 1 is a perspective view of one form of acoustic receiver assembly illustrative of an embodiment of the invention;

FIG. 2 is similar to FIG. 1, but is illustrative of an alternative form of acoustic receiver assembly;

FIG. 4 is similar to FIG. 3, but illustrative of an alternative embodiment of acoustic receiver assembly;

FIG. 5 is a side elevational view of the assembly shown in FIG. 4; and

DESCRIPTION OF THE PREFERRED EMBODIMENTS

Figure 3:
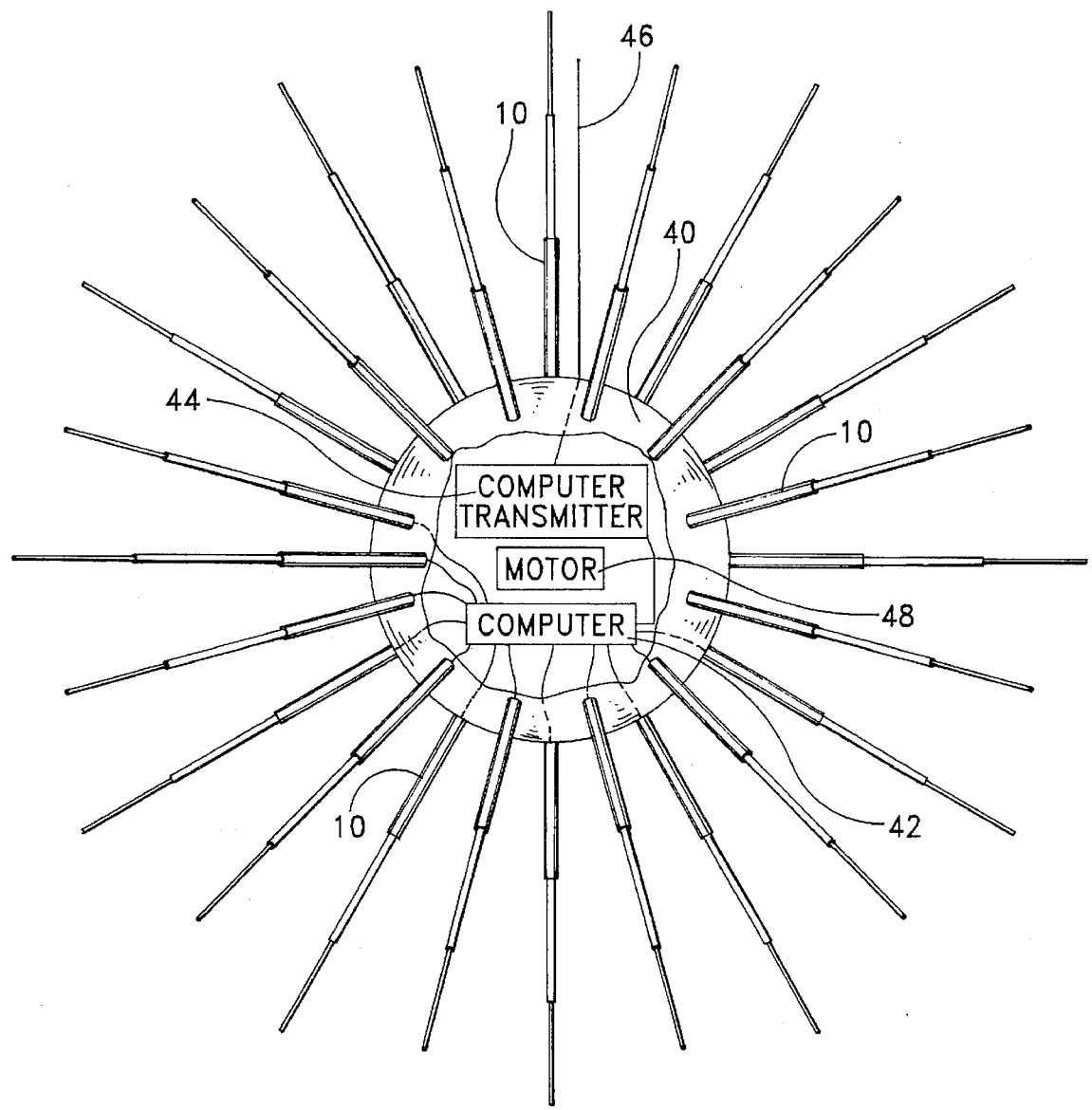
FIG. 3 is a diagrammatic representation of an acoustic receiver assembly including several of the assemblies of FIG. 1.

Referring to FIG. 1, it will be seen that in one form of the invention the acoustic receiver assembly includes a first tubular body 10 having embedded in an outer wall 12 thereof a multiplicity of first acoustic receivers 14, which may be hydrophones, or the like.

A second tubular body 20 is slidably movable in first tubular body 10 and is extendible therefrom, as shown in FIG. 1. A multiplicity of second acoustic receivers 24 are embedded in an outer wall 22 of second tubular body 20. The outer wall 22 of the second body 20, is configured complementarily to an inside portion 16 of first body 10, such that second body 20 and second acoustic receivers 24 are received in first tubular body 10 and retained therein until deployed.

The first and second tubular bodies may be cylindrically configured, as shown in FIG. 1, or of any selected shape, such as tear-drop shaped, as shown in FIG. 2, to facilitate laminar flow of water therearound. As long as the inside portion 16 of the first tubular body 10' slidingly accepts the second tubular body 20', and acoustic receivers 24 thereon, the configuration of outer walls 12, 22 may be of any appropriate shape selected for a particular mission.

As shown in the drawings, the assembly preferably includes a third body 30, 30' having embedded in an outer wall 32, 32' thereof third acoustic receivers 34. The third body 30, 30' and the acoustic receivers 34 thereon, are slidably movable in an inside portion 26 of the second tubular body 20 and are extendible therefrom.

It will be apparent that the assembly structures shown in FIGS. 1 and 2 can be provided with additional telescoping bodies, as required.

Referring to FIG. 3, it will be seen that in a further form of the invention the acoustic receiver assembly includes a housing 40 and a plurality of the aforementioned first tubular bodies 10 fixed thereon and extending therefrom. In the embodiment illustrated in FIG. 3, the housing 40 is generally spherical in configuration and the first bodies 10 extend generally radially therefrom.

Each of the first bodies 10 slidingly receives one of the second bodies 20 which, in turn, slidingly receives one of the third bodies 30, all as described above. In the housing 40 there is disposed a computer 42 in communication with each of the acoustic receivers 14, 24, 34 mounted on bodies 10, 20, 30, and a radio receiver/transmitter 44 in communication with computer 42 and with an antenna 46 mounted on housing 40. Thus, any acoustic energy detected by the acoustic receivers 14, 24, 34 is received by computer 42 which determines parameters, such as location, direction of movement, and speed of movement, of the acoustic energy source, and signals the parameters to transmitter 44 which forwards the information, by way of antenna 46, to a receiving station (not shown).

In housing 40 there is further disposed a motor 48 operable to move the second bodies 20 into and out of the first bodies 10, and the third bodies 30 into and out of the second bodies 20. The motor may be activated by a water pressure or water contact starter (not shown) or by a signal received by the receiver/transmitter 44 from a remote station (not shown).

In FIGS. 4 and 5, there is shown an alternative embodiment in which the housing 40' is disc-shaped and the tubular bodies 10", 20", 30" extend radially outwardly from the housing, substantially in a single plane (FIG. 5). Note that in FIG. 5, some bodies have been omitted for clarity. The housing 40' can be disposed on board a vessel, such as a submarine, or beneath the waterline in a surface vessel. The housing 40' preferably is disposed vertically, as shown in FIG. 5, for sound detection in a selected area above or below or to port or to starboard of the vessel. Alternatively, the housing 40 is disposed horizontally and the assembly provides wide horizontal coverage, which is useful in bottom scanning for detection of mines, and the like.

Figure 6:
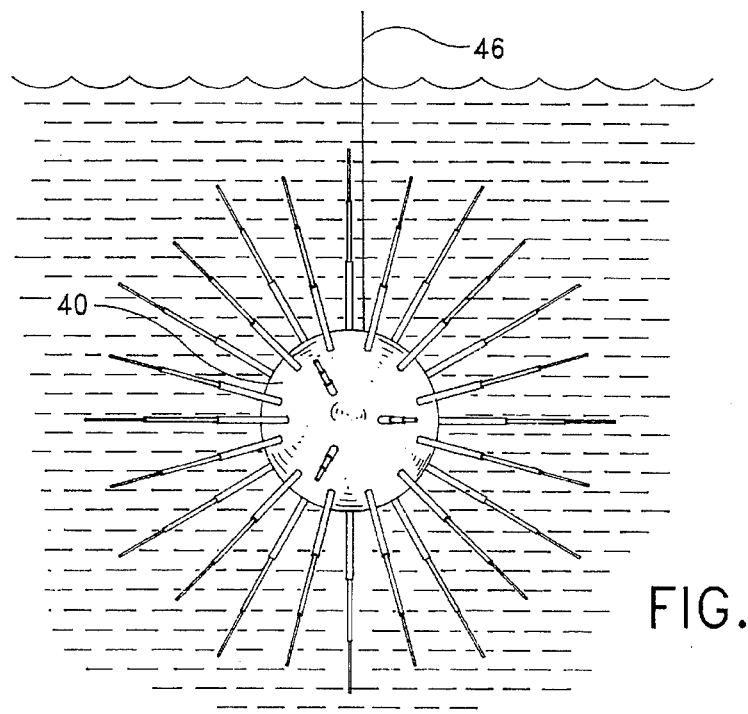
FIGS. 6–10 are diagrammatic illustrations of types of acoustic receiver assemblies in various modes of operation.

Referring to FIG. 6, it will be seen that the embodiment shown in FIG. 3 may be deployed in water and detect acoustic energy from all directions and azimuths.

Figure 7:
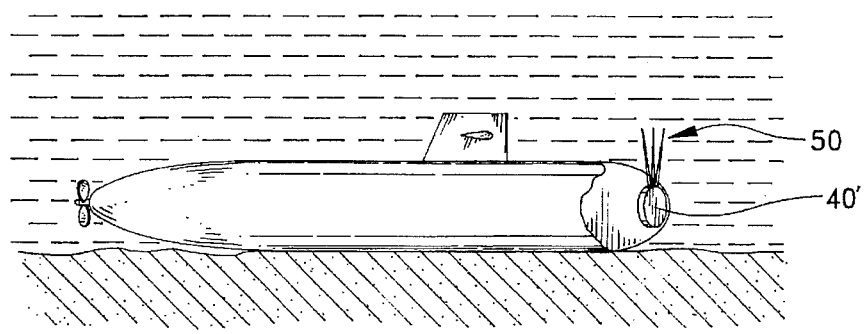
Figure 8:
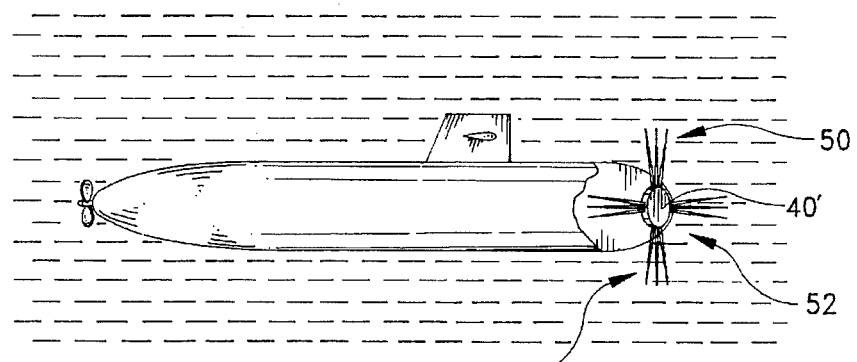
Figure 9:
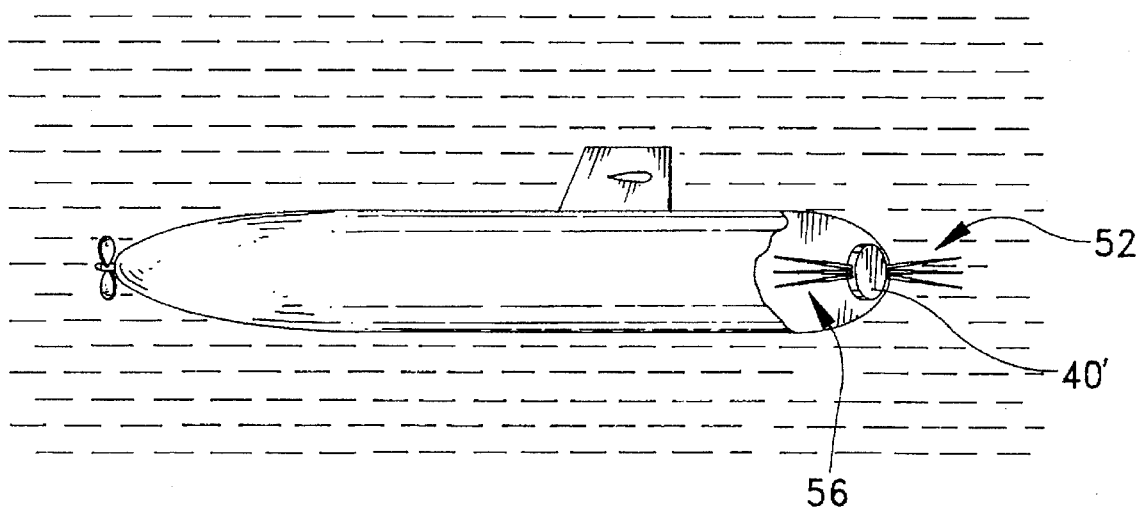

The embodiment shown in FIGS. 4 and 5 may be used onboard submarines and surface vessels for detection in a selected direction. It is preferred that the first bodies 10 be grouped to provide an array in each of several general directions, four groups 50, 52, 54, 56 being shown in FIG. 4, with each group comprising three first bodies 10". Preferably, the groups are selectably extendible. In FIG. 7, a bottomed submarine is shown with group 50 extended to detect acoustic energy from above. In FIG. 8, a submarine moving forward has all four groups 50, 52, 54, 56 extended, to detect acoustic energy from port, starboard, above and below the submarine. In FIG. 9, a submarine underway and submerged has groups 52 and 56 extended to detect noise to the side of the submarine.

Figure 10:
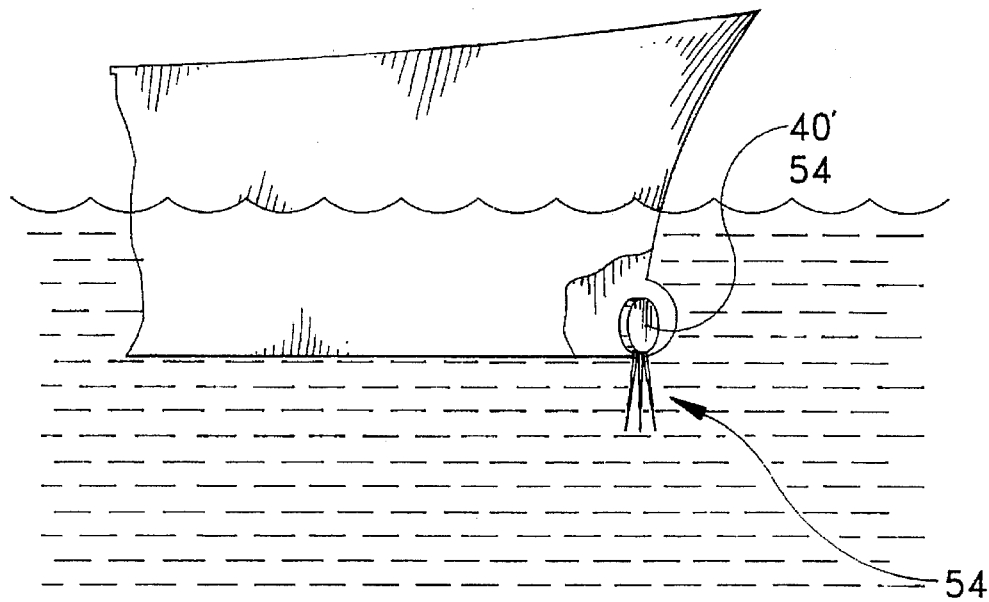

In FIG. 10, there is shown a surface vessel having the assembly shown in FIG. 4 onboard with group 54 extended to explore downwardly. Alternatively, the housing 40' can be positioned horizontally, as discussed above, with all groups extended to scan a large bottom area for acoustic activity. If mounted vertically, as shown in FIGS. 5 and 10, a group of the first bodies such as group 50, which is not required in a surface vessel, may be omitted from the assembly.

The housings 40, 40' are about 33 feet in diameter and the first, second and third bodies 10, 20, 30 are, fully extended provides an acoustic receiver spread, or "aperture" of about 123 feet. The first, second and third bodies are long and thin, much like the sections of a telescoping radio antenna used on automobiles, providing a whip-like assembly.

There is thus provided a telescoping sonar system which provides a large aperture for underwater receiving arrays for improved direction, classification and localization of underwater sound sources.

It is to be understood that the present invention is by no means limited to the particular construction herein disclosed and/or shown in the drawings, but also comprises any modifications or equivalents within the scope of the claims. For example, while the acoustic receiving assembly has been illustrated with respect to submarines and surface vessels, it will be apparent to those skilled in the art that the system described herein has utility in torpedoes, remotely piloted vehicles, mini-submarines, unmanned underwater vehicles, and the like. The system disclosed herein, while suitable for military applications, also finds utility in commercial vessels, such as fishing vessels.

What is claimed is:

1. An acoustic receiver assembly comprising:
   a first tubular body;
   a multiplicity of first acoustic receivers disposed on an outer surface of said first body;
   a second tubular body slidably movable in said first tubular body and extendible therefrom; and
   a multiplicity of second acoustic receivers disposed on an outer surface of said second body, said second acoustic receivers being receivable by said first body.

2. The assembly in accordance with claim 1 wherein said outer surface of said second body is configured complementarily to an inside portion of said first body.

3. The assembly in accordance with claim 2 wherein said first and second bodies are of a cylindrical configuration.

4. The assembly in accordance with claim 2 wherein said first and second bodies, in transverse cross-section, are of a generally tear-drop configuration.

5. The assembly in accordance with claim 1, further comprising a third body slidably movable in said second body and extendible therefrom, and a multiplicity of third acoustic receivers disposed on an outer surface of said third body, said third acoustic receivers being receivable by said second body.

6. An acoustic receiver assembly comprising:
   a housing;
   a plurality of first tubular bodies extending from said housing;
   a multiplicity of first acoustic receivers disposed on an outer surface of each of said first tubular bodies;
   a plurality of second tubular bodies slidably movable in each of said first tubular bodies and extendible therefrom; and
   a multiplicity of second acoustic receivers disposed on an outer surface of each of said second bodies, said second acoustic receivers being receivable by said first bodies.

7. The assembly in accordance with claim 6, said assembly further comprising:
   a computer disposed in said housing and in communication with each of said acoustic receivers;
   a radio receiver/transmitter disposed in said housing and in communication with said computer;
   an antenna extendible from said housing and in communication with said receiver/transmitter; and
   whereby acoustic energy detected by said acoustic receivers is received by said computer which determines parameters of said acoustic energy and signals said parameters to said transmitter which forwards the information to said antenna, from which an outbound signal carries the information to a receiving station.

8. The assembly in accordance with claim 7, said assembly further comprising a motor disposed in said housing and operative to move said second bodies outwardly from and into said first bodies.

9. The assembly in accordance with claim 6, wherein said housing is of a generally spherical configuration.

10. The assembly in accordance with claim 6, said assembly further comprising:

a third body slidably movable in each of said second bodies and extendible therefrom; and a multiplicity of third acoustic receivers disposed on an outer surface of each of said third bodies, said third acoustic receivers being receivable in said second bodies.

* * * * *